Jan. 8, 1963
F. F. FISHER
3,072,175
BOILER TUBE ELONGATION MEASURING DEVICE
Filed April 27, 1959
2 Sheets-Sheet 1
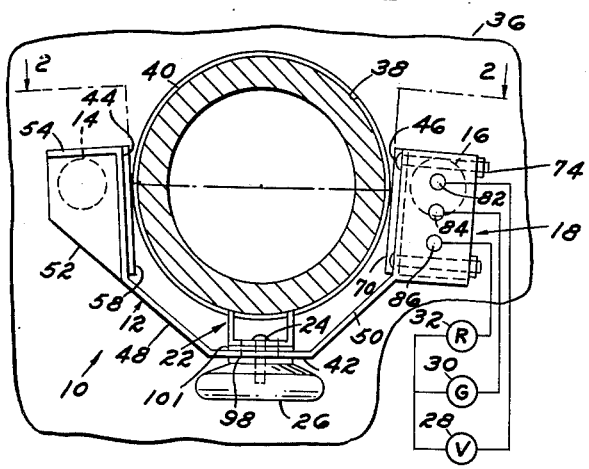
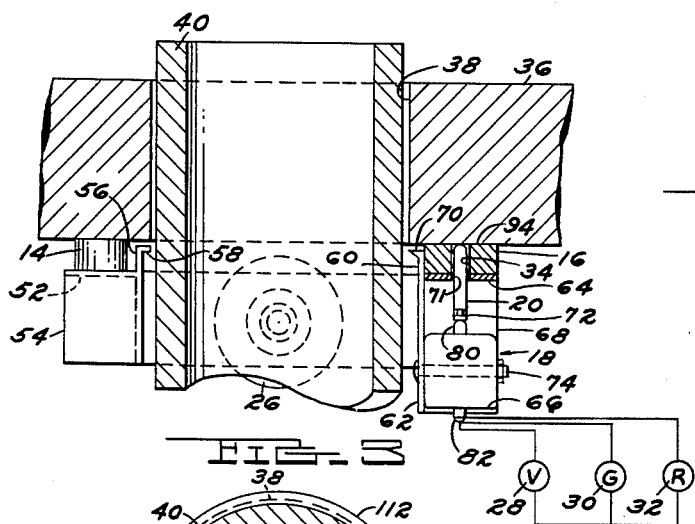
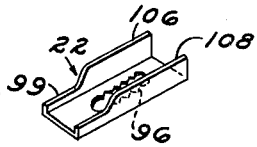
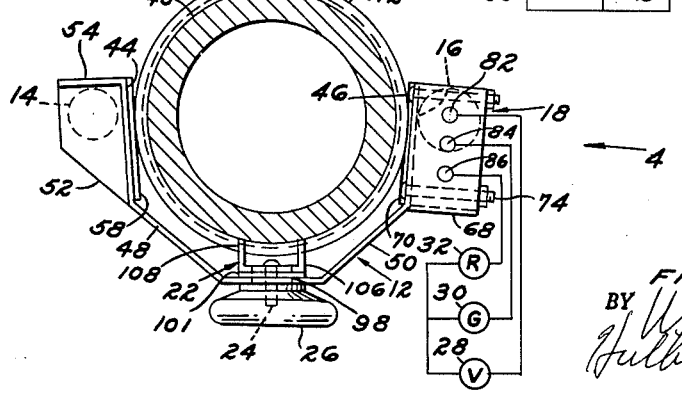
INVENTOR.
FRANK F. FISHER
BY
ATTORNEYS

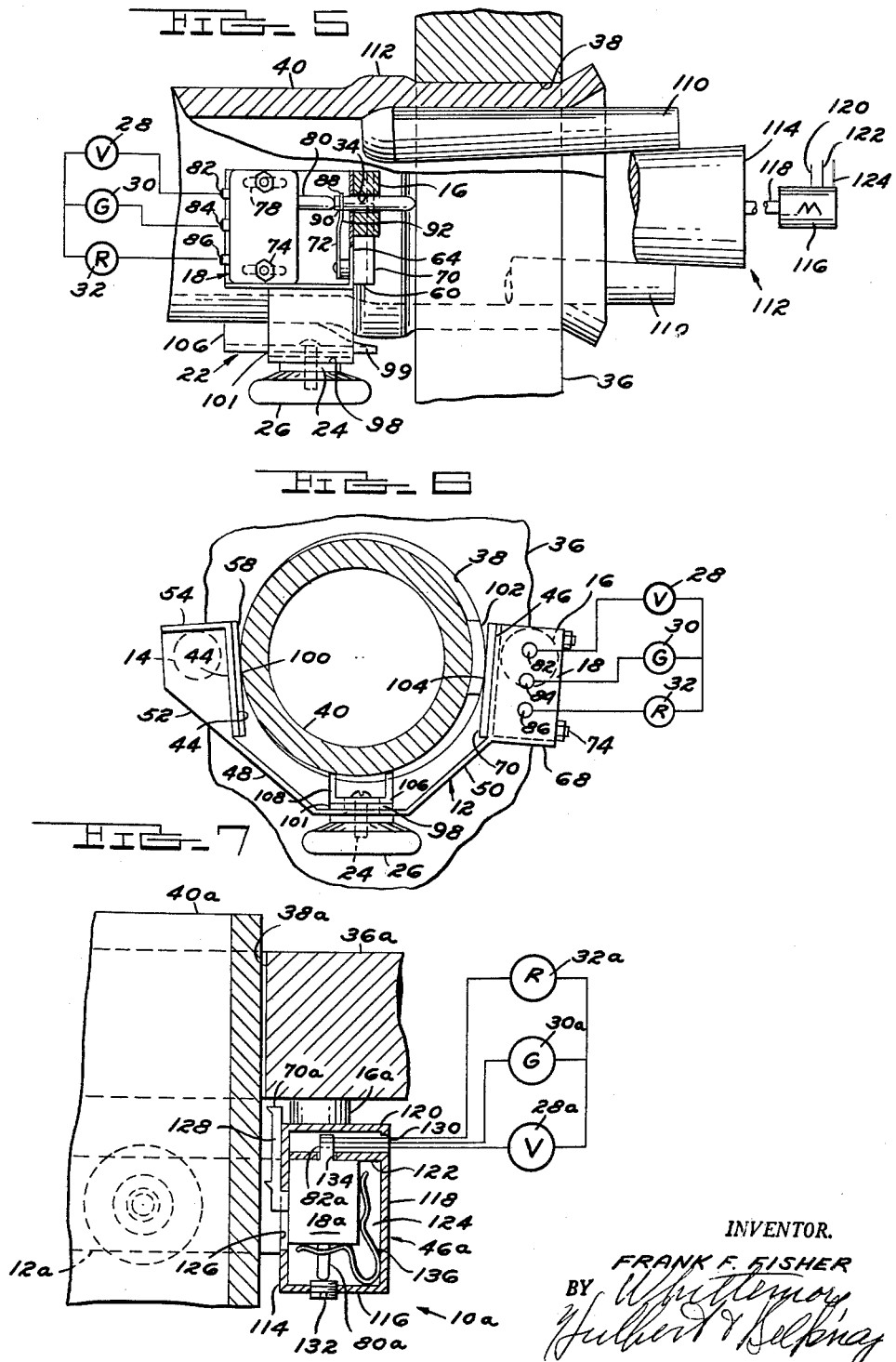

United States Patent Office 3,072,175
Patented Jan. 8, 1963

3,072,175
BOILER TUBE ELONGATION MEASURING DEVICE
Frank F. Fisher, 14111 Sussex, Detroit 27, Mich.
Filed Apr. 27, 1959, Ser. No. 808,996
12 Claims. (Cl. 153—81)

The present invention relates generally to measuring devices and refers more particularly to a tube elongation measuring device for measuring the elongation of a tube such as a boiler tube during the installation thereof by the "tube expanding" or "rolling-in" technique.

The technique of "tube expanding" or "rolling-in" of a boiler tube consists of inserting the tube into a slightly oversized tube hole in the member to which it is to be joined, and cold working the open end of the tube by means of a motor driven rotating expander until the end of the tube is expanded radially into firm contact with the member to which it is being attached around the circumference of the tube hole and continuing the cold working for a time thereafter sufficient to produce a proper tube joint.

The amount of cold working or "rolling" of a tube connection joint after the tube has contacted the member to which it is being joined around the circumference of the tube hole is critical in the formation of a proper joint. Too little rolling produces a joint which will leak or fail when tested. Too much rolling may produce joints which appear sound when tested but which are apt to fail when subjected to sudden shock or stresses. The problem arises then of how to measure the cold working of a tube joint after the tube has been expanded into contact with the member to which it is being joined.

Torque measurement, power consumption, and elongation measurement controls have been used in the past to determine the amount of cold working of the tube joint after the tube is expanded to the diameter of the tube hole. Both torque measurement and power consumption control of tube expanding is unsatisfactory in many instances due to flares usually required on the tube and the fact that many tubes must be rolled by means of angle drives, knuckle joints and other devices which cause additional torque and consume additional power which varies in the installation of different tubes and during a single rolling cycle.

The elongation measurement control of tube expanding is however based on the actual work performed on an expanded joint. This method of control is not affected by variations in the power consumed by or the torque applied to the rotary expander. The elongation measurement control of tube expanding is possible due to the following facts.

During the expanding of a tube in making a tube joint with the usual parallel rolling expander, the kneading action of the rollers of the expander first enlarges the tube end into firm contact with the member to which the tube is being joined. This initial enlargement is accompanied by a very slight thinning of the tube wall. When the tube firmly contacts the member to which it is being joined the metal around the tube hole is compressed slightly and forms a restraining barrier to any further radial enlargement of the tube. Consequently, any tube end metal displaced by continued rolling of the tube joint being formed cannot be displaced radially, but is constrained to flow axially of the tube. This axial flow of metal under continued rolling of a tube joint after contact is made by the tube with the member to which it is being joined is approximately equal on each side of the member and is proportional to the cold working of the joint. Therefore the elongation of the tube under continued rolling of the joint being formed after the tube has been expanded to the diameter of the tube hole is a measure of the work performed on the joint. This elongation may be measured for a particular tube expansion and the rolling-in of the tube stopped when the axial expansion of the tube indicates the proper amount of work has been completed after contact between the tube and the member to which it is being joined to produce an optimum tube joint.

In the past the measurement of such tube elongation has been accomplished by means of a dial indicator clamped to the tube on the other side of the joint being formed opposite from the rotary expander. This measuring means has been unsatisfactory due to the necessity of careful attachment to the tube of the dial indicator to prevent erroneous elongation indications and the fact that the indicator oscillates violently during the expansion of the tube until contact is made by the tube with the metal at the edge of the tube hole. When contact has been made by the tube with the metal at the edge of the tube hole a careful reading of the indicator has been required in the past. It has then been necessary in the past to pay close attention to the indicator dial until the desired amount of elongation is registered thereon at which time it was necessary that a signal be given to the expander operator to cause him to stop rolling the joint. Since tube installation men are generally not accustomed to working with fine instruments and minute measurements the elongation measurement control of expanding tube joints is not universally used.

Therefore it is one of the objects of this invention to provide a device for the measurement of the elongation of a tube such as a boiler tube during installation thereof by the tube expanding technique which is operable to measure elongation only after the tube contacts the member to which it is being joined.

Another object is to provide a device for the measurement of tube elongation during installation of tubes such as boiler tubes, which device is rugged and uncomplicated so that it may be used by the usual tube installation workman under field conditions.

More specifically it is an object to provide a device for the measurement of axial expansion of tubes such as boiler tubes and the like during installation thereof by the tube expansion method which in operation is attached to the member to which the tube is to be joined until the tube is expanded into contact with the metal around the circumference of the tube hole in said member and which thereafter automatically attaches to the tube being expanded and travels therewith during the elongation thereof due to further rolling-in of the joint and measures said elongation while traveling with said tube.

Still more specifically an object is to provide a device for the measurement and indication of the axial expansion of tubes such as boiler tubes during the installation thereof in a tube hole in a boiler or similar structure by the tube expansion method including means to secure the device to the boiler or similar structure adjacent the tube hole therein, means to cause attachment of the device to the tube on expansion of the tube to fill the tube hole whereby said device is caused to move with said tube on axial expansion thereof due to further rolling-in of the tube, means to measure the axial movement of said device and means to indicate predetermined axial movement of said device.

It is a further object to provide a device for the measurement and indication of the axial expansion of tubes such as boiler tubes during the installation thereof in a tube hole in a boiler or similar structure by the rolling-in method including means to secure the device to the boiler or similar structure adjacent the tube hole therein, measuring means included in said device and adapted to attach to said tube on expansion of said tube into contact with said boiler or similar structure and to follow the axial expansion of said tube on further rolling thereof, and means to indicate the optimum axial expansion of said tube during the rolling thereof as measured by said measuring means.

Other objects and features of the invention will become apparent as the description proceeds, especially when taken in conjunction with the accompanying drawings, illustrating a preferred embodiment of the invention, wherein:

FIGURE 1 is a rear elevation of the measuring device of the invention shown in place on the inner surface of a boiler in conjunction with a boiler tube positioned to be joined to the boiler.

FIGURE 2 is a partly broken away view of the measuring device of FIGURE 1 taken on the line 2—2 in FIGURE 1.

FIGURE 3 is a rear elevation of the measuring device of the invention shown in FIGURE 1 in place on the inner surface of a boiler after the boiler tube has been joined to the boiler.

FIGURE 4 is a perspective view of the combination stop and leveler element of the measuring device of FIGURE 1.

FIGURE 5 is a partly broken away side elevation of the measuring device of the invention positioned as shown in FIGURE 3 and taken in the direction of arrow 4 in FIGURE 3.

FIGURE 6 is a front elevation of the measuring device of FIGURE 1 illustrating the adjusting of the measuring device for use with a particular tube hole size.

FIGURE 7 illustrates a modification of the measuring device of FIGURE 1 wherein only the measuring means moves with the axial elongation of the tube instead of the entire measuring device as is the case with the embodiment of the invention illustrated in FIGURE 1.

One embodiment of the tube elongation measuring device of the invention will now be described with particular reference to the figures. As shown in FIGURES 1 and 2 the elongation measuring device generally indicated 10 comprises U-shaped fork or clamp 12, a pair of permanent magnets 14 and 16 secured to the fork 12, a measuring device in the form of a switch 18 also attached to the bracket 12, a spring pressed plunger 20 operably associated with the switch 18 and extending through the magnet 16, and stop and leveler 22 secured to the fork 12 by means of bolt 24 in conjunction with knob or handle 26. The elongation and measuring device 10 is also provided with a voltage source 28 and indicator lamps 30 and 32 operable in conjunction with the switch 18 to present a visual indication of a particular elongation measured by device 10.

More specifically permanent magnets 14 and 16 as shown in the figures are generally circular disks. Magnets 14 and 16 may be secured to the fork 12 by any convenient means such as a strong adhesive. Magnet 16 is constructed with a passage 34 therethrough as best shown in FIGURES 2 and 4 which will be discussed later in conjunction with plunger 20. The function of the magnets 14 and 16 in the elongation measuring device 10 is to secure the measuring device to the wall 36 of a boiler or the like adjacent a tube hole 38 therein as shown in the figures. Magnets 14 and 16 are of such strength that they will firmly hold the device 10 in a fixed position on the wall 36 against accidental displacement. The device 10 is however allowed to move horizontally due to contact with radially expanding tube 40 within hole 38 so that the tube 40 in expanding may center the device 10 if initial contact is made by tube 40 with device 10 on only one side of the device 10. Permanent magnets 14 and 16 must also allow dislodgment thereof from wall 36 by axial elongation of tube 40 after the fork 12 becomes attached to the radially expanding tube 40 as will later be explained in more detail.

Fork 12 as best shown in FIGURE 1 includes a horizontal central portion 42, two vertical sides or legs 44 and 46 and connecting portions 48 and 50 between the central portion 42 and the leg 44 and between the central portion 42 and the leg 46 respectively. It will be noted that legs 44 and 46 diverge in a direction away from the central portion 42. This divergence is provided to facilitate the proper positioning of the elongation measuring device 10 as will later be described. Fork 12 is semi-rigid so that it will firmly grasp tube 40 on radial expansion thereof into contact with wall 36 around the circumference of tube hole 38.

A member 52 shaped as shown in FIGURE 1 is secured to the leg 44 of fork 12 at right angles thereto. Member 52 is provided for the attachment of magnet 14 to fork 12. A second member 54 is provided at the top of leg 44 as shown in FIGURE 1 and acts between leg 44 and member 52 to add strength and rigidity to the structure formed by member 52 and leg 44. Leg 44 is also provided with an extension 56 in the plane thereof as shown in FIGURE 2 which terminates in a portion perpendicular to leg 44 forming an abutment 58 facing inwardly of fork 12. Abutment 58 is provided to contact the surface of a radially expanding tube 40 in the operation of device 10 as will later be seen.

Leg 46 is provided with extensions 60 and 62 at opposite edges thereof as shown best in FIGURE 2, with vertically extending perpendicular members 64 and 66, and with horizontally extending perpendicular member 68 as illustrated in the figures. Extension 60 as shown has a contact spur 70 on one edge thereof positioned to grip the surface of a radially expanding tube 40 during use of device 10. Member 64 is provided for the attachment of permanent magnet 16 to the fork 12 and to provide means for attachment of the spring 72 of the spring pressed plunger 20 as shown in FIGURE 5. An orifice 71 is provided in member 64 in registration with the passage 34 through magnet 16 to permit passage of plunger 20 therethrough. Member 66 in conjunction with the extension 62 of leg 46 provides a mounting means for switch 18. Member 68 adds strength and rigidity to the structure formed by leg 46 and members 64 and 66.

Measuring device or switch 18 is attached to leg 46 of fork 12 by means of bolts 74. Switch 18 may be adjusted in a direction toward or away from magnet 16 by means of bolts 74 and slots 78 in leg 46 which are best shown in FIGURE 5. Switch 18 is a plunger 80 actuated snap acting double throw single pole switch such as may be procured commercially. The switch 18 may be for example a "Micro-Switch Sub-Miniature" switch No. 1SM1. The switch 18 is capable of measuring tube elongations of approximately .015 of an inch per inch of the tube diameter with an accuracy of the order of .001 of an inch. Switch 18 is provided with three terminals 82, 84 and 86 which are connected within the switch so that with plunger 80 extended a predetermined amount as shown in FIGURE 5 contact is made between terminals 82 and 86 and with the plunger 80 extended any lesser amount contact is made between terminals 82 and 84.

Plunger 20 is inserted through the orifice 71 in member 64 into the passage 34 in permanent magnet 16. The passage 34 serves as a guide for the movement of plunger 20. As illustrated best in FIGURE 5 the plunger is provided with a groove 88 near the end 90 thereof. A spring 72 is mounted on member 64 which is attached to leg 46 as shown best in FIGURE 5. The end 92 of spring 72 is slotted to surround the grooved end 90 of plunger 20 as shown in FIGURE 5. Groove 88 and the slotted end of spring 72 cooperate to bias plunger 20 in a direction away from switch 18 and toward the surface 94 of permanent magnet 16. Groove 88, spring 72 and passage 34 also cooperate to secure plunger 20 to device 10. Plunger 80 of switch 18 is in line with plunger 20 as shown in the figures and extends and retracts with movement of plunger 80 in and out of passage 34.

A voltage source 28 and indicator lamps 30 and 32 are connected in the manner shown in FIGURE 1 to terminals 82, 84 and 86 respectively of switch 18 and are connected to each other as illustrated. Voltage source 28 may be a six or twelve volt battery of example. The connections between the voltage source 28, the indicator lamps 30 and 32 and the switch 18 is such that lamp 32 will be energized by voltage source 28 through a circuit including voltage source 28, terminals 82 and 86 of switch 18, indicator lamp 32 and the connections therebetween when the plunger 80 of the switch 18 is extended over a predetermined amount as shown in FIGURE 5. When the plunger 80 of the switch 18 is retracted beyond a predetermined position the snap acting switch 18 will open an internal connection between terminals 82 and 86 and will close an internal connection between terminals 82 and 84 whereby a circuit is then created through voltage source 28 to terminal 82 from terminal 82 to terminal 84, from terminal 84 to indicator lamp 30, through indicator lamp 30 and back to voltage source 28. In the operation of the elongation measuring device 10 the making and breaking of these circuits due to the extension or retraction of plunger 80 is made use of to indicate to the expander operator making the tube joint on which the elongation is being measured the relative extent of elongation of tube 40 during installation thereof. Indicator lamp 32 is colored red and indicator lamp 30 is colored green for this purpose as will later be explained.

A combination leveler and stop 22 is positioned on the central portion 42 of fork 12 as shown in FIGURE 1. The leveler and stop is best shown in FIGURE 4 and is provided for use in the installation of a plurality of similar tubes 40 in similar size tube holes 38. As shown the stop 22 is provided with a central slot 96 which is splined as shown to be positioned over similar splines on a projection 98 of knob 26. The knob 26 and stop 22 are secured to fork 18 by means of a bolt 24. The function of knob 26 is to permit convenient handling of device 10 and removal thereof from a tube 40 after installation of the tube. The exact function of a stop 22 will become more apparent on consideration of the positioning of device 10 in the use thereof. The notches 99 are provided in the upstanding legs 106 and 108 of stop 22 to clear bulge 112 in tube 40 which will subsequently be discussed.

In the positioning of the device 10 for measurement of the elongation of a tube 40 during installation thereof in a tube hole 38 of a wall 36 of a boiler or the like the tube 40 is first inserted in the tube hole 38 and is made to contact one side 100 thereof as shown in FIGURE 6. A feeler or positioning gage 102 is then inserted between the tube 40 and the surface of the tube hole 38 at the opposite side 104 of the tube hole. The device 10 is then moved upward as shown in FIGURE 6 until the abutment 58 and the contact 70 on the diverging legs 44 and 46 contact the tube 40 and the gage 102 as shown in FIGURE 6. In the upward movement of the device 10 magnets 14 and 16 are moved along the inner surface of the wall 36 so that when the abutment 58 and contacting sput 70 contact the tube 40 and gage 102 the device 10 can be released and will remain attached to surface 36 in the position shown in FIGURE 6. The gage 102 may then be removed from tube hole 38 and the tube 40 may be centered within the tube hole in position for the joining thereof to the wall 36.

On a particular job wherein many holes 38 are of the same size it may be advantageous to provide a stop 22 on device 10 after the device 10 has been positioned in the above described manner so that subsequent positioning of device 10 may be accomplished by merely moving device 10 into position around the tube 40 as shown in FIGURE 6 until the upstanding legs 106 and 108 of stop 22 contact the tube 40. In this manner it will be noted that device 10 may be positioned with respect to tube 40 while tube 40 is in various locations within the tube hole by adjustment of the legs 106 and 108 of stop 22. Stop 22 may be positioned on projection 98 of knob 26 by means of washers 101 having a predetermined thickness to insure contact of legs 106 and 108 with tube 40 when the device 10 is in the desired position. Alternatively stop 22 may be made adjustable to allow desired positioning of legs 106 and 108. When the tube holes in a particular job are of substantially different dimensions the stop 22 may be eliminated from device 10. The member 22 when used also serves to level the device 10, that is to say legs 106 and 108 on contacting the surface of tube 40 act to cause the legs 44 and 46 to extend across the tube 40 perpendicular thereto.

In operation the device 10 is positioned at the sides of a tube hole 38 in the manner just described. In this position as shown in FIGURES 1 and 2 the plunger 20 rests on the inner surface of wall 36 and the plunger 80 is retracted making a connection between terminals 82 and 84 of switch 18. The green indicator lamp is therefore lit at this time signaling the expander operator that the device 10 is in position. The tube 40 is then centered in the tube hole 38 and the expanding of the end of the tube 40, by well known means such as a rotary expander generally indicated 112 in FIGURE 5, using a rotating mandrel 114 driven by an electric motor 116 by suitable drive means diagrammatically indicated at 118 to drive rollers 110, is started. The tube 40 is first expanded radially by the kneading action of the rollers 110. During this radial expansion the device 10 remains in position attached to surface 36. On radial expansion of tube 40 into contact with member 36 around the circumference of the tube hole 38 the metal around the circumference of the tube hole 38 is slightly compressed and a bulge 112 appears in the tube 40 adjacent the inner surface of the member 36 as shown best in FIGURE 5. Since the device 10 has been positioned so that the abutment 58 and the contact spur 70 are exactly at the edge of the tube hole 38 they are contacted by the tube 40 in its radial expansion beyond the original circumference of the tube hole 38. The tube 40 is securely gripped by the device 10 as it continues to expand radially to produce the bulge 112 due to the semi-rigid nature of fork 12.

Since the end of tube 40 is restrained from further radial expansion due to its contact with the tube hole 38 after a slight compressing of the metal around the edge of tube hole 38 the tube will elongate axially on further kneading of the tube end by rollers 110. On axial elongation of tube 40 the device 10 which at this time securely grips tube 40 moves axially with tube 40 away from the inner surface of wall 36 to the position shown in FIGURES 3 and 5. The contact between the wall 36 and the permanent magnets 14 and 16 is of course broken by the axial movement of device 10.

As previously stated and as shown in FIGURE 2 plunger 20 at the start of the axial elongation of the tube 40 is in contact with the inner surface of wall 36 and is level with the face 94 of permanent magnet 16. In this position the plunger 80 of switch 18 is retracted causing a connection to be made between terminals 82 and 84 of switch 18 whereby green indicator lamp 30 is caused to light. As the tube 40 elongates axially and the device 10 including permanent magnet 16 travels axially with tube 40 the plunger 20 biased by spring 72 remains in contact with the inner surface of wall 36. Therefore plunger 20 moves into the position illustrated in FIGURE 5 wherein it extends for a distance in front of the surface 94 of magnet 16 which is equal to the axial elongation of tube 40. This allows the plunger 80 of switch 18 to extend a similar distance. When the axial elongation of tube 40 has reached a predetermined amount to assure a correct tube joint as preset by the positioning of switch 18 with bolts 74 the extension of plungers 20 and 80 will be such that the connection between terminals 82 and 84 in switch 18 will be broken and a contact will be made between terminals 82 and 86 whereby the green indicator lamp 30 will go out and the red indicator lamp 32 will be illuminated. The change in illumination of the lights 30 and 32 which are placed so that they may be observed by the expander operator forming the tube joint are used as a signal that sufficient work has been done on the particular joint to form an optimum tube joint and that rolling of the joint should be halted. Alternatively the terminals 82, 84 and 86 of switch 18 may be directly connected to leads 120, 122 and 124 on the motor 116 as shown in FIGURE 5 to stop the operation of the motor when a predetermined elongation of the tube 40 has been measured by the switch 18.

Thus it can be seen that the device 10 provides means for automatically signaling the expander operator or halting the expanding operation when a tube joint has been completed which is rugged enough for use under field conditions, is unaffected by movement of tube 40 before tube 40 is expanded into contact with wall 36 and is extremely accurate in the measuring of tube elongation as an indication of work done on a tube joint.

A modification 10a of the elongation measuring device 10 is shown in FIGURE 7. In the modification 10a elements similar to the device 10 shown in FIGURES 1–6 will be given similar numbers. As shown the device 10a is similar to the device 10 except in the structure associated with the leg 46a of fork 12a. Leg 46a as shown includes the vertical members 114, 116, 118 and 120 arranged in the form of a rectangle as illustrated. The structure of leg 46a also includes a vertically extending member 122 positioned between members 114 and 118 as shown. A horizontal member 124 similar to member 68 of leg 46 as shown in FIGURE 2 is provided on the lower end of leg 46a. Member 124 serves to add strength and rigidity to the leg 46a. Member 114 as illustrated is provided with a slot 126 therein to receive the arm 128 which is provided on switch 18a and allows movement of arm 128 in a direction parallel to tube 40a. An opening 130 is provided in member 118 between the member 118 and the member 120 as shown to allow indicator lamps 30a and 32a and voltage source 28a to be connected to the terminals 82a, 84a and 86a of switch 18a. A positioning screw 132 is threaded in member 116 in the position shown in FIGURE 7 to adjust the travel of the plunger 80a of switch 18a necessary to cause switch 18a to actuate. Member 122 is provided to initially position switch 18a and as shown has a slot therein adapted to receive the terminals 82a, 84a and 86a of switch 18a. Switch 18a with arm 128 attached is positioned as shown in the structure of leg 46a and is initially held against members 114 and 122 by garter spring 136.

In use the device 10a is similar to the device 10. However with the device 10a the switch 18a moves relative to the leg 46a while the device 10a remains secured to the wall 36a. Thus as tube 40a expands radially into contact with wall 36a the contacts spurs 70a on arm 128 which is attached to switch 18a contact the surface of the tube 40a. Then as the tube 40a elongates axially on further rolling of the tube joint the arm 128 and the switch 18a connected thereto move away from the wall 36a in the same manner that the entire device 10 previously moved away from wall 36. The plunger 80a is therefore caused to retract into switch 18a a distance equal to the amount of axial elongation of the tube 40a. At a predetermined tube elongation switch 18a is set by means of screw 132 to actuate whereby the circuit through indicator lamp 30a from voltage supply 28a is broken and a circuit through indicator lamp 32a from the voltage supply is made producing a signal which may be used to stop the working of tube 40a. Thus the same end result is achieved in substantially the same manner with both the modification 10a and the device 10.

It will be understood that the signal from voltage sources 28 and 28a produced on actuation of switches 18 and 18a may be used for purposes such as to turn off the power supplied to the expander instead of being used to light indicator lights. Also while the device has been considered assuming that abutment 58 grips the surface of tube 40 and follows the elongation thereof the accuracy of the device 10 is not materially affected by slippage of abutment 58 on tube 40.

The drawings and the foregoing specification constitute a description of the improved boiler tube elongation measuring device in such full, clear, concise and exact terms as to enable any person skilled in the art to practice the invention, the scope of which is indicated by the appended claims.

What I claim as my invention is:

1. An elongation measuring device for measuring elongation of a boiler tube or the like during installation thereof in a tube hole in a header by a tube expansion method, comprising holding means on said device for releasably attaching said device to the surface of said header adjacent the hole, clamping means secured to said device and operable to initially grip the tube on radial expansion of the tube into full contact with the surface of the hole whereby said clamping means is constrained to move axially with the tube only on elongation of the tube subsequent to the expansion thereof into contact with the surface of said hole, and measuring means including a first member attached to and movable axially with said clamping means and a second member fixed during the measuring operation relative to said header and hence movable relative to said first member, said measuring means being operable to measure the elongation of the tube with respect to said header subsequent to expansion of the tube into engagement with the surface of the hole.

2. An elongation measuring device for measuring elongation of a boiler tube or the like during installation thereof in a tube hole in a header by a tube expansion method, comprising holding means on said device for releasably attaching said device to the surface of said header adjacent the hole, clamping means secured to said device and operable to initially grip the tube on radial expansion of the tube into full contact with the surface of the hole whereby said clamping means is constrained to move axially with the tube only on elongation of the tube subsequent to the expansion thereof into contact with the surface of said hole, measuring means including a first member attached to and movable axially with said clamping means and a second member fixed during the measuring operation relative to said header and hence movable relative to said first member, said measuring means being operable to measure the elongation of the tube with respect to said header subsequent to expansion of the tube into engagement with the surface of the hole, and means to indicate a predetermined axial elongation of the tube.

3. An elongation measuring device for measuring elongation of a boiler tube or the like during installation thereof in a tube hole in a header by a tube expansion method, comprising holding means on said device for releasably attaching said device to the surface of said header adjacent the hole, relatively rigid U-shaped clamping means having sides diverging away from the connection therebetween secured to said device and operable to initially grip the tube on radial expansion of the tube into full contact with the surface of the hole whereby said clamping means is constrained to move axially with the tube only on elongation of the tube subsequent to the expansion thereof into contact with the surface of the hole, and measuring means including a first member attached to and movable axially with said clamping means and a second member fixed during the measuring operation relative to said header and hence movable relative to said first member, said measuring means being operable to measure the elongation of the tube with respect to said header subsequent to expansion of the tube into engagement with the surface of the hole.

4. The measuring device as claimed in claim 3 including a combination stop and leveler member attached to said clamp at the connection between the sides thereof for assisting in positioning the device with respect to the tube hole.

5. An elongation measuring device for measuring elongation of a boiler tube or the like during installation thereof in a tube hole in a header by a tube expansion method, comprising holding means on said device for releasably attaching said device to the surface of said header adjacent the hole, clamping means secured to said device and operable to initially grip the tube on radial expansion of the tube into full contact with the surface of the hole whereby said clamping means is constrained to move axially with the tube only on elongation of the tube subsequent to the expansion thereof into contact with the surface of said hole, and a switch, including a body member attached to and movable axially with said clamping means and also including a plunger biased during the measuring operation into continuous contact with said header and hence movable relative to said body member, said switch being operable to measure the elongation of the tube with respect to said header subsequent to expansion of the tube into engagement with the surface of the hole.

6. The device as claimed in claim 5 wherein the holding means is a pair of permanent magnets one of which has a passage therethrough and including a second spring pressed plunger in line with the first mentioned plunger and extending through said passage.

7. An elongation measuring device for measuring elongation of a boiler tube or the like during installation thereof in a tube hole in a header by a tube expansion method, comprising a U-shaped rigid bracket, holding means on said bracket for releasably attaching said bracket to the surface of said header adjacent the hole, measuring means resiliently held for guided movement within said bracket, means secured to said measuring means and operable to initially grip the tube only on radial expansion thereof into contact with the surface of said hole whereby said measuring means is constrained to move axially with said tube on subsequent axial expansion of the tube to measure the subsequent axial expansion and means attached to said measuring means to indicate a predetermined axial expansion of said tube.

8. Apparatus for accomplishing the controlled installation of a boiler tube or the like in a tube hole in a header by a tube expansion method, comprising means for expanding the tube into contact with the surface of the hole, measuring means adapted to be positioned about the tube in the tube hole initially operable on expansion of the tube into contact with the surface of the tube hole to thereafter measure the axial elongation of the tube, and means secured to said measuring means and connected to said means for expanding the tube responsive to a predetermined elongation to terminate operation of said expanding means.

9. Apparatus for accomplishing the controlled installation of a boiler tube or the like in a tube hole in a header by a tube expansion method, comprising means for expanding the tube into contact with the surface of the hole including rollers in contact with the inner surface of the tube, a rotatable mandrel in driving relation to said rollers, and a motor operable to rotate said mandrel, measuring means adapted to be positioned about the tube hole, means initially operable on expansion of the tube into contact with the surface of the tube hole to thereafter measure the axial elongation of the tube, and means secured to said measuring means and connected to said means for expanding the tube responsive to a predetermined elongation to terminate operation of said motor.

10. The method of adjusting the position of a generally forked shaped elongation measuring device having a pair of outwardly divergent fork legs, for measuring the elongation of a boiler tube or the like during installation thereof in a tube hole in a header by a tube expansion method, in accordance with the actual tube hole size, comprising placing the tube in the tube hole with one side of the tube in contact with the inner surface of the tube hole at one point thereon, placing a positioning gage between the tube and the inner surface of the tube hole opposite said one point thereon, and moving said elongation measuring device toward the tube with the divergent fork legs oriented to straddle the tube, one leg being adjacent said one point, the other leg being adjacent said positioning gage until said one leg contacts the tube and said other leg contacts the gage.

11. The method of adjusting the position of a generally forked shaped elongation measuring device having a pair of outwardly divergent fork legs and a central portion therebetween, for measuring the elongation of boiler tubes or the like during installation thereof in similar size tube holes in a header by a tube expansion method, in accordance with the actual size of the tube holes, comprising placing a tube in one of the tube holes in contact with the inner surface of the tube hole at one point thereon, placing a positioning gage between the tube and the inner surface of the tube hole opposite said one point thereon and moving said elongation measuring device toward the tube with the divergent fork legs oriented to straddle the tube, one leg being adjacent said one point, the other leg being adjacent said positioning gage until said one leg contacts the tube and said other leg contacts said gage, positioning a stop on said central portion of said measuring device to extend between said central portion and the tube and thereafter adjusting the measuring device to each similar tube hole by straddling a tube within the tube hole with said divergent legs and moving the measuring device toward the tube until said stop contacts the tube.

12. An elongation measuring device for measuring elongation of a boiler tube or the like during installation thereof in a tube hole in a header by a tube expansion method, comprising holding means on said device for releasably attaching said device to the surface of said header adjacent the hole, clamping means secured to said device and operable to initially grip the tube on radial expansion of the tube into full contact with the surface of the hole whereby said clamping means is constrained to move axially with the tube only on elongation of the tube subsequent to the expansion thereof into contact with the surface of said hole and measuring means operable on expansion of said tube into contact with the surface of said hole to thereafter measure the axial elongation of said tube.

References Cited in the file of this patent

UNITED STATES PATENTS

| 2,041,915 | Fisher | May 26, 1936 |
| 2,198,041 | Peters | Apr. 23, 1940 |
| 2,355,852 | Fisher | Aug. 15, 1944 |
| 2,572,999 | Elliott | Oct. 30, 1951 |
| 2,659,972 | Norris | Nov. 24, 1953 |

FOREIGN PATENTS

| 566,250 | Germany | Dec. 13, 1932 |